United States Patent
Zhang et al.

(10) Patent No.: US 11,674,524 B2
(45) Date of Patent: Jun. 13, 2023

(54) SLIM FAN AND OIL BEARING STRUCTURE OF FAN

(71) Applicant: CHAMP TECH OPTICAL (FOSHAN) CORPORATION, Foshan (CN)

(72) Inventors: Yong-Kang Zhang, Foshan (CN); Yung-Ping Lin, New Taipei (TW); Jian-Wei Yang, Foshan (CN)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 337 days.

(21) Appl. No.: 16/899,371

(22) Filed: Jun. 11, 2020

(65) Prior Publication Data

US 2021/0348621 A1 Nov. 11, 2021

(30) Foreign Application Priority Data

May 8, 2020 (CN) .......................... 202010383938.1

(51) Int. Cl.
F04D 29/057 (2006.01)
F16C 32/06 (2006.01)

(52) U.S. Cl.
CPC ........ F04D 29/057 (2013.01); F16C 32/0633 (2013.01); F05B 2240/53 (2013.01); F16C 2360/46 (2013.01)

(58) Field of Classification Search
None
See application file for complete search history.

(56) References Cited

U.S. PATENT DOCUMENTS

| | | | | |
|---|---|---|---|---|
| 5,610,462 A | * | 3/1997 | Takahashi | H02K 5/1675 310/90 |
| 2002/0102039 A1 | * | 8/2002 | Horng | F16C 33/10 384/279 |
| 2005/0180668 A1 | * | 8/2005 | Yazawa | F16C 33/107 384/100 |
| 2016/0177764 A1 | * | 6/2016 | Lemoine | F16J 15/441 277/313 |
| 2018/0231007 A1 | * | 8/2018 | Zhang | H02K 5/1675 |
| 2021/0148369 A1 | * | 5/2021 | Wang | F04D 29/522 |
| 2021/0384802 A1 | * | 12/2021 | Tamura | H02K 21/14 |

\* cited by examiner

Primary Examiner — Michael Lebentritt
(74) Attorney, Agent, or Firm — ScienBiziP, P.C.

(57) ABSTRACT

An oil bearing structure of a fan includes a shaft seat, a rotating shaft, and an oil bearing. The shaft seat includes a boss. A middle portion of the boss defines a slot. One end of the rotating shaft is inserted into the slot. Another end of the rotating shaft is a free end. The oil bearing is sleeved on an outer periphery of the rotating shaft. An axis of the rotating shaft and an axis of the oil bearing are perpendicular to the shaft seat. An effective length of the oil bearing and the rotating shaft is 50%-70% of a length of the fan.

4 Claims, 2 Drawing Sheets

SLIM FAN AND OIL BEARING STRUCTURE OF FAN

FIELD

The subject matter herein generally relates to fans, and more particularly to a slim fan and an oil bearing structure of the fan.

BACKGROUND

A fan is a key component of a computer cooling system. Due to the low cost and low noise characteristics of oil bearings, oil bearings are widely used in fans. When the oil bearing is in a non-operating state, lubricant fills pores of the oil bearing. During operation, shaft rotation generates heat due to friction, and thermal expansion of the oil bearing reduces the pores. Therefore, the lubricant overflows and enters into a bearing gap. When the shaft stops rotating, the oil bearing cools, the pores recover, and the lubricant is sucked back into the pores. Due to the importance of the location of the oil bearing, the life of the oil bearing will directly affect the life of the fan.

BRIEF DESCRIPTION OF THE DRAWINGS

Implementations of the present disclosure will now be described, by way of embodiments, with reference to the attached figures.

DETAILED DESCRIPTION

Figure 1:
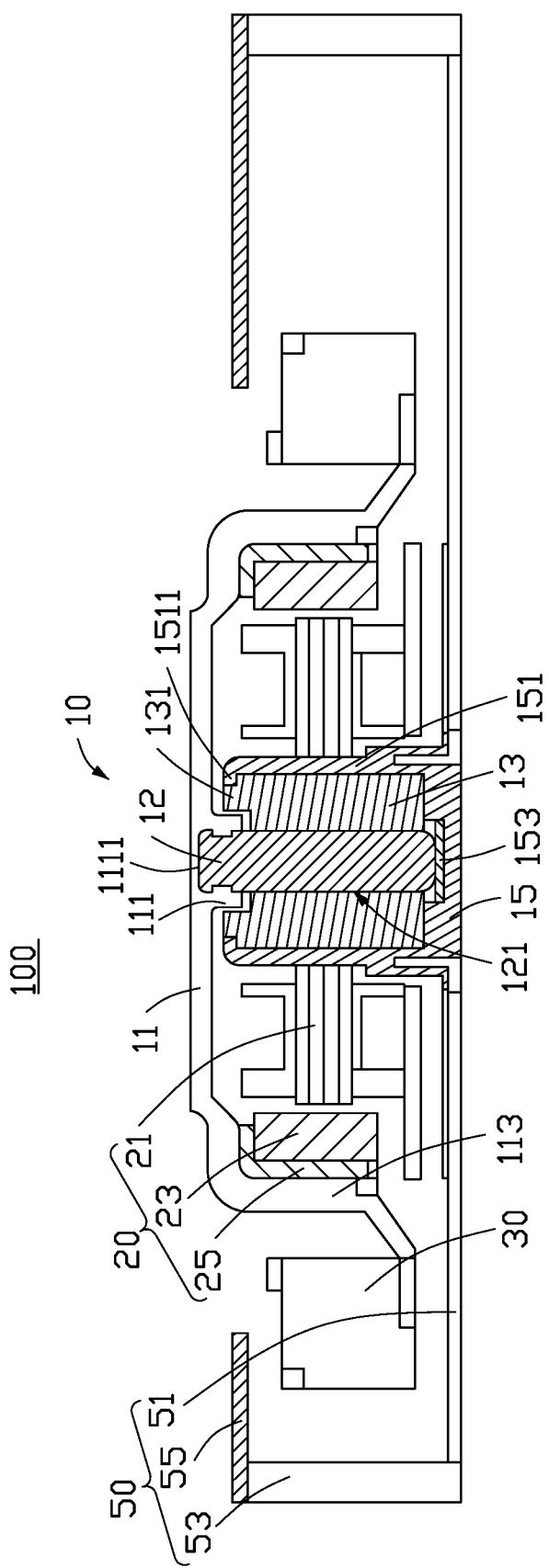
FIG. 1 is a cross-sectional view of an embodiment of a slim fan.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of a slim fan 100 including an oil bearing structure 10, a motor assembly 20, a plurality of fan blades 30, and a fan housing 50. The oil bearing structure 10 is located substantially at a center of the slim fan 100, and the motor assembly 20, the plurality of fan blades 30, and the fan housing 50 are sequentially arranged on an outer periphery of the oil bearing structure 10 from inside to outside.

Figure 2:
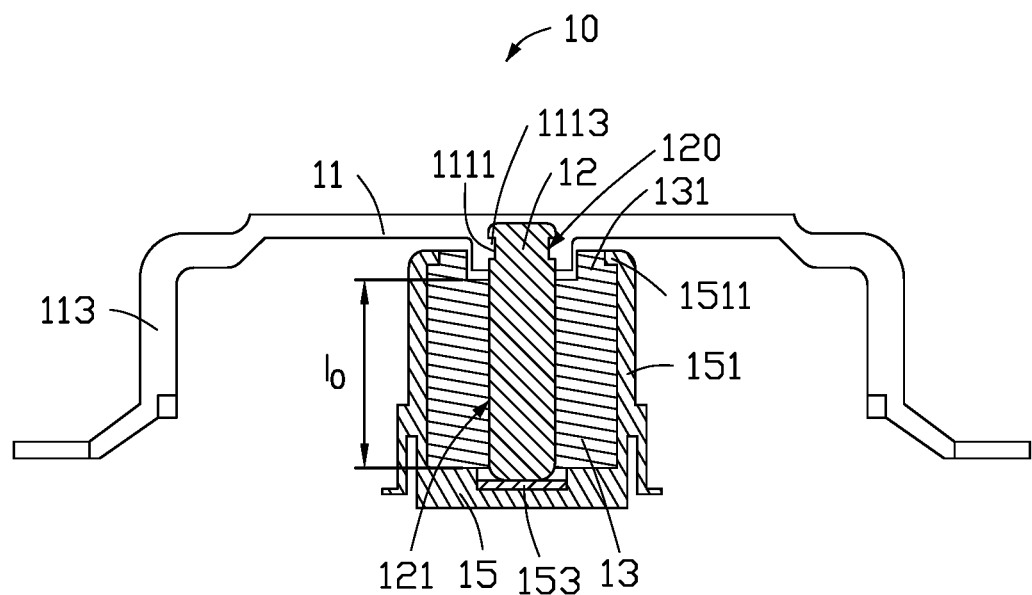
FIG. 2 is a cross-sectional view of an oil bearing structure of the slim fan.

Referring to FIG. 2, the oil bearing structure 10 includes a shaft seat 11, a rotating shaft 12, an oil bearing 13, and a base 15. The shaft seat 11 and the base 15 are substantially disk-shaped and substantially parallel to each other. The rotating shaft 12 and the oil bearing 13 are located between the shaft seat 11 and the base 15, and an axis of the rotating shaft 12 and an axis of the oil bearing 13 are substantially perpendicular to a plane in which the shaft seat 11 is located. In one embodiment, an effective length between the oil bearing 13 and the rotating shaft 12 accounts for 50-70% of a length of the slim fan 100. Specifically, the effective length between the oil bearing 13 and the rotating shaft 12 accounts for 60% of the thickness of the slim fan 100. The effective length in this application refers to an effective length $l_0$ of a contact surface between the oil bearing 13 and the rotating shaft 12.

The shaft seat 11 includes a boss 111 and an extending portion 113. The boss 111 has a cylindrical shape and is located on a side surface of the shaft seat 11 facing the base 15. A slot 1111 is defined in the boss 111 to fix the rotating shaft 12. The extending portion 113 extends from an outer periphery of the shaft seat 11 toward the base 15. The extending portion 113 has a substantially annular shape.

An end of the rotating shaft 12 is inserted into the slot 1111, and an oil film 121 is covered on an outer periphery of the rotating shaft 12. An area of the outer periphery of the rotating shaft 12 corresponding the end of the rotating shaft 12 includes a recess 120. A protruding portion 1113 protrudes from an inner surface defining the slot 1111, and the protruding portion 1113 is embedded into the recess 120. The oil bearing 13 is sleeved on the rotating shaft 12, and a shaft hole is defined in a center of the oil bearing 13 for the insertion of the rotating shaft 12. In one embodiment, the outer diameter of the oil bearing 13 is larger than the outer diameter of the boss 111, and an end of the oil bearing 13 facing the shaft seat 11 is provided with a support portion 131 covering an outer periphery of the boss 111. A gap between the oil bearing 13 and the boss 111 is 0.15 mm. The support portion 131 increases the effective length between the oil bearing 13 and the rotating shaft 12, so that the oil bearing 13 wraps the rotating shaft 12 better. Furthermore, by limiting the gap between the oil bearing 13 and the boss 111, the loss of lubricating oil in the oil bearing 13 can be effectively prevented. In other embodiments, the gap between the oil bearing 13 and the boss 111 may be 0.15-0.25 mm.

The base 15 is used to abut the end of the rotating shaft 12 away from the shaft seat 11. The base 15 is provided with a fixing ring 151 and a wear-resistant plate 153. The fixing ring 151 is ring-mounted on an outer periphery of the oil bearing 13. A limiting ring 1511 is provided on a side of the fixing ring 151 away from the base 15. The limiting ring 1511 abuts an end of the support portion 131 facing away from the oil bearing 13. The wear-resistant plate 153 is disposed on the side of the base 15 facing the rotating shaft 12. Specifically, the wear-resistant plate 153 is disposed at the end of the rotating shaft 12, and the wear-resistant plate 153 abuts end surfaces of the base 15 and the rotating shaft 12.

Referring to FIG. 1, the motor assembly 20 is disposed within the extending portion 113. The motor assembly 20 includes a motor 21, a magnet 23, and a motor housing 25. The motor 21 is fixedly mounted on an outer periphery of the fixing ring 151. The motor housing 25 is disposed on an inner wall of the extending portion 113. The magnet 23 is located between the motor 21 and the motor housing 25. The magnet 23 is fixed to an inner wall of the motor housing 25. In one embodiment, a printed circuit board is also fixed on the motor 21.

The plurality of fan blades 30 is disposed on an outer periphery of the extending portion 113, and the plurality of fan blades 30 is arranged in a circumferential array. The fan blade 30 has a fixed structure extending toward the extending portion 113. The fan blade 30 is fixed to the extending portion 113 by the fixing structure. In one embodiment, the fixing structure is a free end of the extending portion 113 extending toward the fan blade 30.

The fan housing 50 is disposed around the outer periphery of the fan blades 30. The fan housing 50 includes a bottom cover 51 and a fan frame 53. The bottom cover 51 is substantially coplanar with the base 15. The bottom cover 51 has a disk shape. The fan frame 53 surrounds the outer periphery of the bottom cover 51. The fan frame 53 is located on a side of the bottom cover 51 facing the shaft seat 11. In one embodiment, the fan housing 50 further includes an upper cover 55. The upper cover 55 is located at an end of the fan frame 53 facing away from the bottom cover 51. The upper cover 55 has a ring shape.

The effective length of the oil bearing and the rotating shaft is usually greater than 40% and less than 50% of the length of the fan. In this application, by increasing the effective length of the contact surface of the oil bearing and the rotating shaft, the bearing wraps the rotating shaft better, so that the rotating shaft rotates more stably, and the radial load bearing capacity of the rotating shaft is enhanced, which can effectively extend the service life of the rotating shaft and effectively reduce noise when rotating. At the same time, the center of gravity of the rotor is adjacent to the center of the bearing, so that the interaction force between the rotating shaft and the bearing is more balanced, and the service life is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A slim fan comprising an oil bearing structure, the oil bearing structure comprising:
    a shaft seat comprising a boss, a middle portion of the boss defining a slot;
    a rotating shaft, one end of the rotating shaft inserted into the slot, and another end of the rotating shaft being a free end; and
    an oil bearing sleeved on an outer periphery of the rotating shaft; wherein:
    an axis of the rotating shaft and an axis of the oil bearing are perpendicular to the shaft seat;
    an effective length of the oil bearing and the rotating shaft is 50%-70% of a length of the slim fan;
    an area of the outer periphery of the rotating shaft corresponding the end of the rotating shaft includes a recess, a protruding portion protrudes from an inner surface defining the slot, and the protruding portion is embedded into the recess;
    an oil film is located between a contact surface of the rotating shaft and the oil bearing, a gap between the oil bearing and the boss is 0.15-0.25 mm, an end of the oil bearing facing the boss is provided with a support portion covering an outer periphery of the boss; the support portion fixes the oil bearing on the boss; and the oil bearing structure further comprises a base located at an end of the oil bearing facing away from the shaft seat for fixing a position of the oil bearing; a fixing ring is arranged on the base, the fixing ring surrounding an outer periphery of the oil bearing; one end of the fixing ring is fixed on the base, and another end of the fixing ring comprises a limiting ring extending toward the end of the oil bearing facing the boss; a wear-resistant plate is disposed at the end of the rotating shaft toward the base; the wear-resistant plate is adhered to the base and the rotating shaft the slim fan further comprises a motor assembly, a plurality of fan blades, and a fan housing; the shaft seat comprises an extending portion extending from an outer periphery of the shaft seat toward the base; the plurality of fan blades is fixed on an outer periphery of the extending portion; and the motor assembly is located on an inner side of the extending portion.

2. The slim fan of claim 1, wherein:
the motor assembly comprises a motor and a motor housing;
the motor is fixed on the outer periphery of the oil bearing; and
the motor housing is fixed on the inner side of the extending portion.

3. The slim fan of claim 1, wherein:
the fan housing comprises a bottom cover and a fan frame;
the bottom cover is disk-shaped;
the fan frame surrounds an outer periphery of the bottom cover;
the bottom cover is located on the end of the rotating shaft facing away from the shaft seat; and
the fan frame is located on a side of the bottom cover facing the shaft seat.

4. The slim fan of claim 3, wherein:
the fan housing further comprises an upper cover;
the upper cover is disk-shaped; and
an outer periphery of the upper cover is fixed on the fan frame.

* * * * *